United States Patent [19]

Tyer et al.

[11] 4,009,667

[45] Mar. 1, 1977

[54] INCINERATOR FOR COMBUSTIBLE REFUSE

[76] Inventors: Robert C. Tyer, 7254 Old Plank Road, Jacksonville, Fla. 32205; Larry C. Bruce, 1800 Kingsley Ave., Orange Park, Fla. 32073

[22] Filed: May 5, 1975

[21] Appl. No.: 574,706

[52] U.S. Cl. .............................. 110/8 A; 110/8 C; 110/110; 110/165 R; 165/87; 110/10
[51] Int. Cl.² .......................................... F23G 5/12
[58] Field of Search ............ 110/7 R, 8 R, 10, 14, 110/110, 165 R; 165/87

[56] References Cited
UNITED STATES PATENTS

| 970,660 | 9/1910 | Stineman | 110/110 |
|---|---|---|---|
| 1,340,274 | 5/1920 | Kelly | 110/110 |
| 2,788,960 | 4/1957 | Skinner et al. | 165/87 X |
| 2,932,712 | 4/1960 | Levin | 110/110 |
| 2,932,713 | 4/1960 | Powers | 110/110 X |
| 2,983,234 | 5/1961 | Reilly | 110/165 X |
| 3,774,555 | 11/1973 | Turner | 110/8 |
| 3,822,651 | 7/1974 | Harris et al. | 110/10 |
| 3,942,455 | 3/1976 | Wallis | 110/110 |

*Primary Examiner*—Kenneth W. Sprague
*Attorney, Agent, or Firm*—Edwin E. Greigg

[57] ABSTRACT

An incinerator having a variable speed auger to continuously feed refuse into and through a combustion chamber and into a water filled ash receptacle. Preheated combustion air is supplied through tangential openings in and along the combustion chamber walls, with the hottest air supplied at the combustion chamber inlet. The auger has a water cooled hollow shaft and a heat resistant flight concentrically spaced away from the auger shaft by support members. The pitch of the auger flight gradually decreases from the inlet end to the discharge end of the combustion chamber. The exhaust gases pass through heat exchangers and dust collectors before being emitted from the incinerator. A portion of the exhaust gas is recirculated by a blower to an air curtain in the front of the inlet unit to preheat the entering refuse.

21 Claims, 6 Drawing Figures

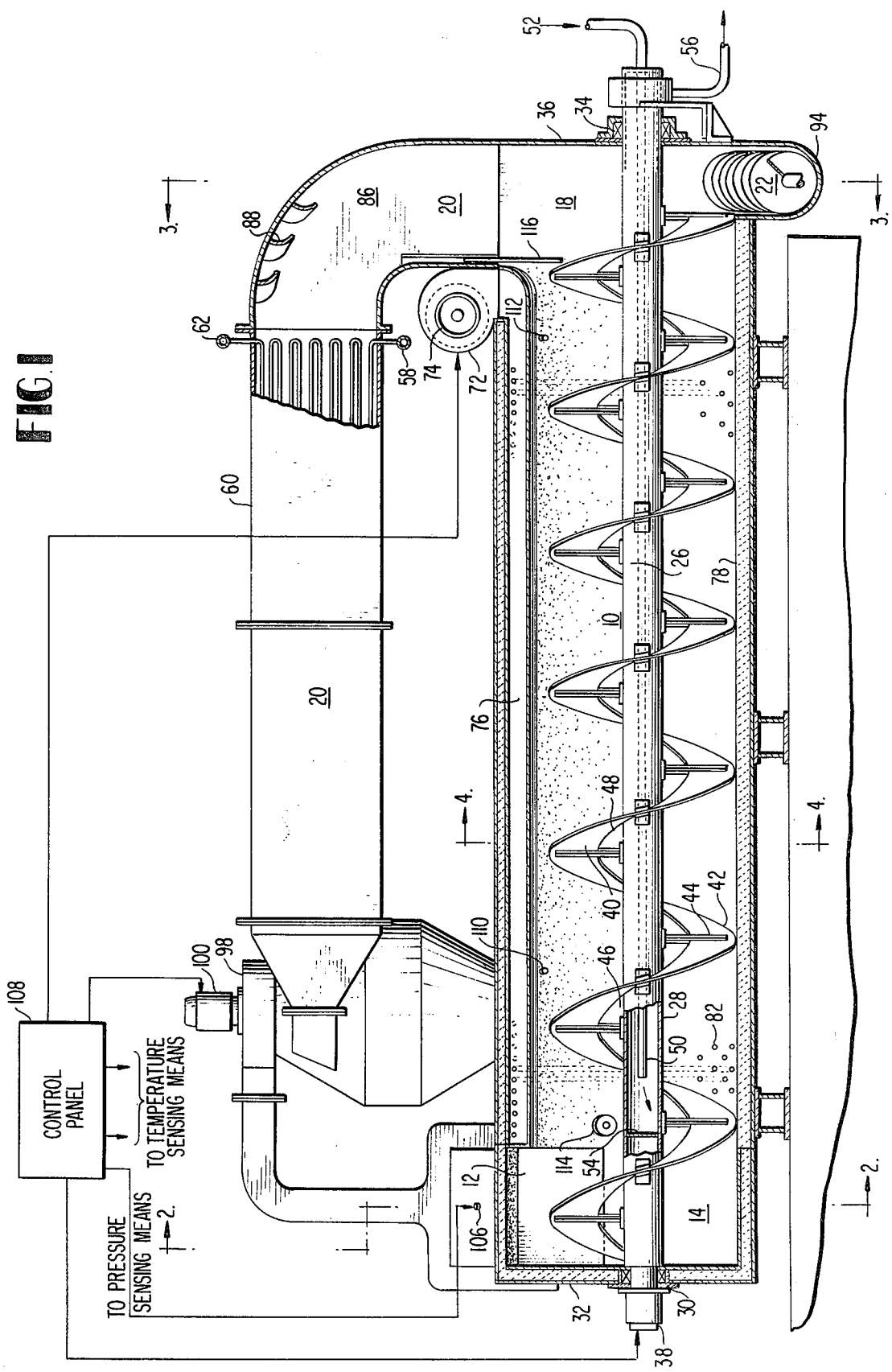

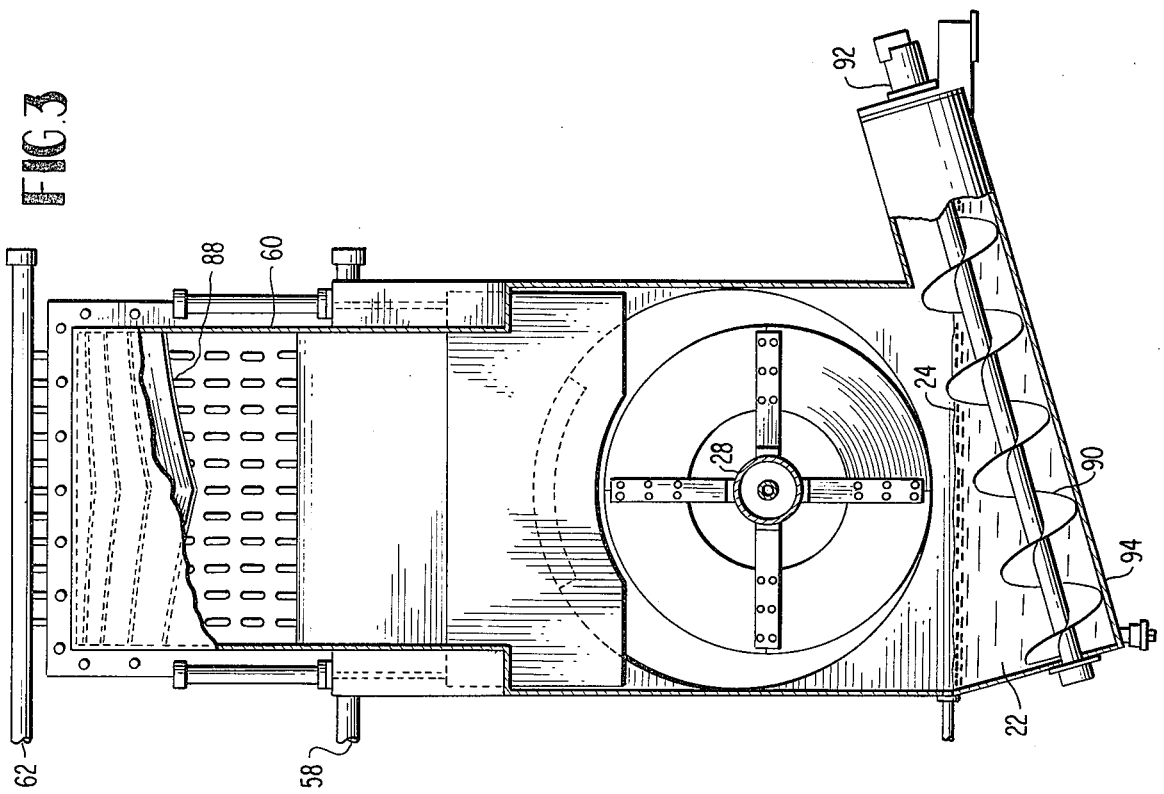
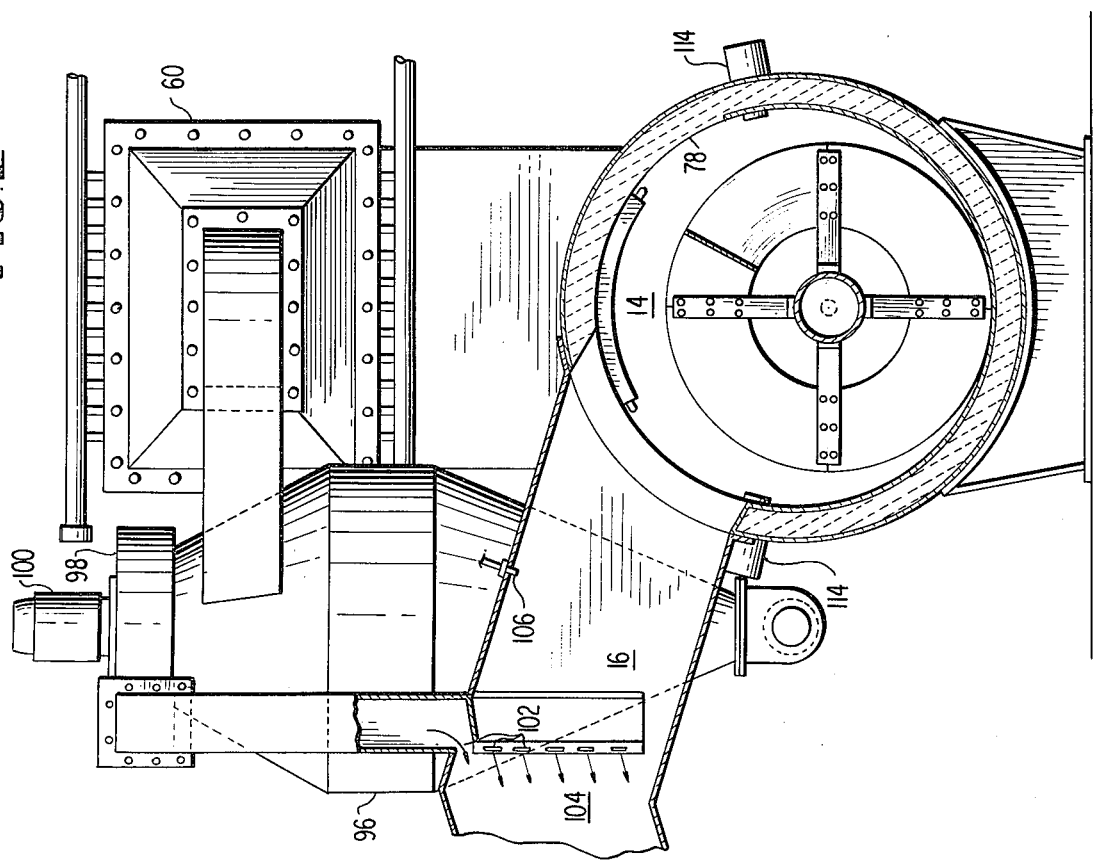

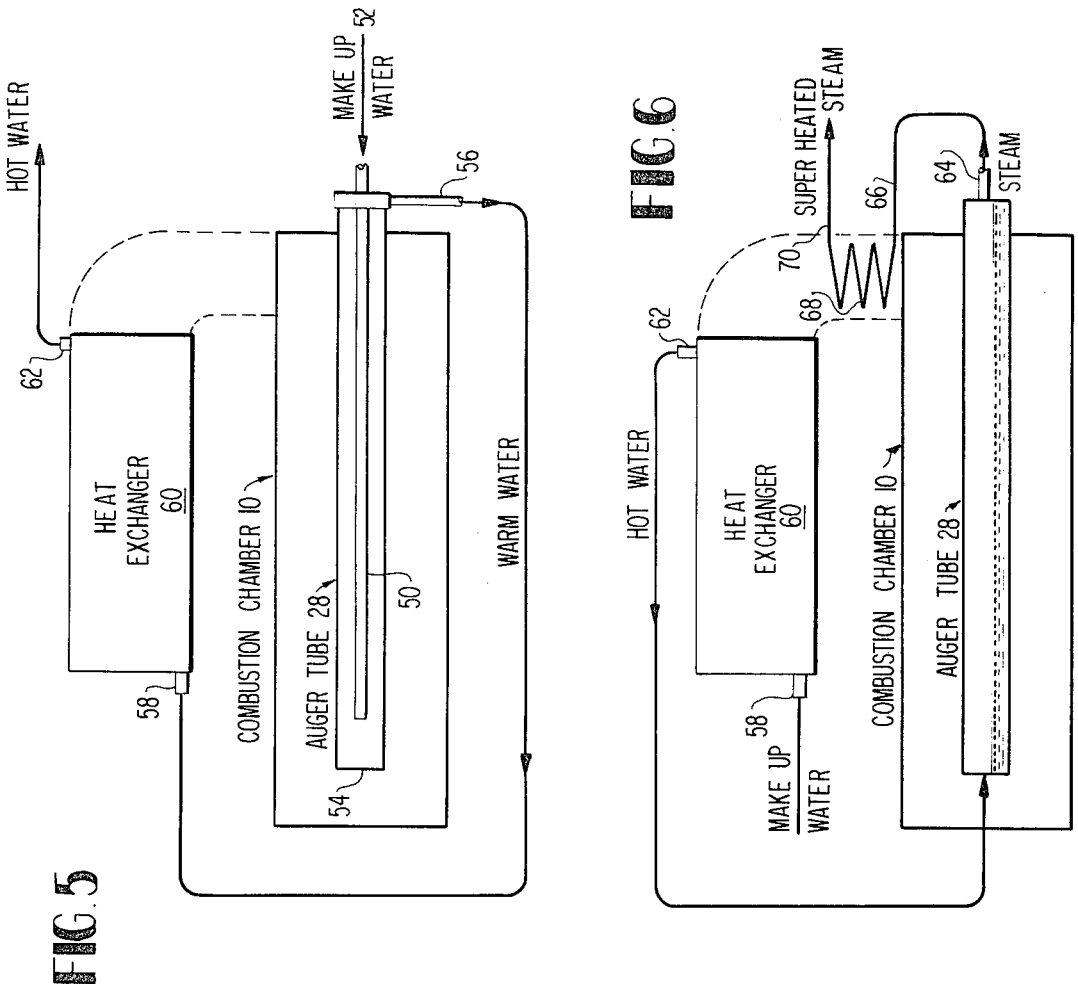
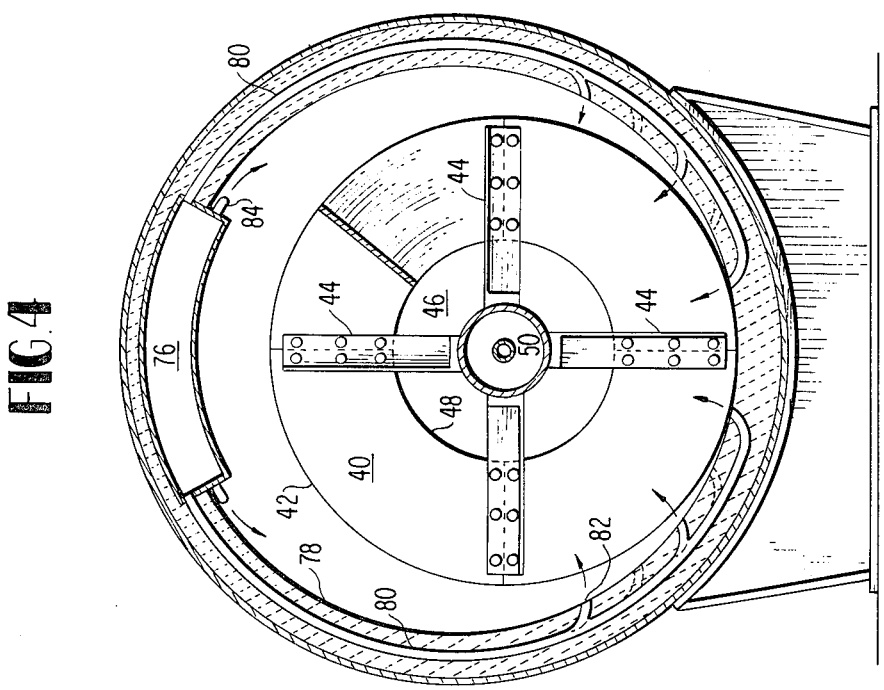

INCINERATOR FOR COMBUSTIBLE REFUSE

BACKGROUND OF THE INVENTION

The invention relates generally to incinerators, and more particularly to continuous controlled movement of combustible refuse into, and through, a combustion chamber by a rotating auger conveyor.

The use of an auger to convey combustible refuse through the combustion cycle results in very accurately controlled movement of refuse through the combustion chamber, in comparison to presently used rotary kiln incinerators. However, if the auger flight is integral with the auger shaft, with no spacing between them, the passage of air through the refuse is restricted, and it is necessary to introduce air into the combustion chamber through the auger shaft and/or auger flight. Also, it is necessary to supply cooling means for the auger flight as well as for the auger shaft. As a result, this type of auger is expensive to manufacture, requiring much welding, and equally expensive to repair or replace parts.

The auger construction used in the present invention overcomes these disadvantages by incorporating an annular space between the auger shaft and auger flight. Thus air can move freely in the combustion chamber except for the space occupied by the auger shaft, and air can be introduced solely through the combustion chamber walls rather than through the auger shaft and flight assembly.

With such an arrangement, the auger flight can be very simply constructed of single sheets of heat resistant material, requiring little or no welding. Different materials can be used for various sections of the auger flight to correspond to the heat to which the auger flight will be exposed in that section of the incinerator. The placement of a section of the auger flight is also made correspondingly easier and less expensive.

Therefore, one object of the present invention is to provide an incinerator which includes a rotatable conveyor having spiral flights to continuously feed refuse into and through the combustion chamber wherein complete combustion can be effected without the need of supplying air through the rotatable conveyor shaft or spiral flights.

It is a further object of this invention to provide an incinerator with a rotatable conveyor having spiral flights, which flights are of simple construction and do not require a cooling means for normal operation, and which can be easily repaired or replaced.

A still further object of this invention is to provide a means for preventing smoke and combustion gases from being emitted from the open inlet to the combustion chamber of this incinerator.

Yet another object of this invention is to provide a means of selectively pre-heating combustion air admitted to the combustion chamber, so that the hottest air is admitted at the inlet end of the chamber to quickly heat incoming refuse, and cooler air is admitted to the exhaust end of the chamber to effect more complete combustion.

Still another object of this invention is to provide a means for moving the combustible refuse through the combustion chamber at a slower rate at the outlet end of the chamber than at the inlet end of the chamber, to effect better combustion of particulate smoke at the outlet end of the chamber, and to compensate for the reduction in volume of the refuse during combustion.

BRIEF SUMMARY OF THE INVENTION

The incinerator for burning combustible refuse disclosed herein has a horizontally disposed stationary cylindrical combustion chamber. Refuse is introduced into an inlet portion of the incinerator from a feed hopper, and conveyed through the furnace by a rotating auger, which also conveys the residue remaining out the other end of the combustion chamber, where it drops into a water filled ash receptacle. The cooled residue is then removed from this ash receptacle by a helical screw mechanism for disposal elsewhere.

Air for combustion is supplied by a fresh air inlet blower through a hot air manifold extending substantially the length of the combustion chamber and forming a top inner portion of the combustion chamber wall. The bottom wall of this hot air manifold is uninsulated to effect good heat transfer from the combustion chamber to the air flowing in the manifold. The air is introduced into the lower part of the combustion chamber through hot air pipes spaced uniformly along both sides of the manifold, and extending around the combustion chamber to randomly spaced openings in the lower part of the combustion chamber, with each hot air pipe connected between the manifold and one air inlet opening.

Air for combustion is also introduced into the top of the combustion chamber through uniformly spaced openings along both vertical sides of the hot air manifold which project downward into the combustion chamber. This air is introduced tangentially to the inner wall of the combustion chamber and is directed downwardly by the curvature of the wall to effect good mixing of air with the refuse. Also, this air flow prevents refuse from sticking to the top inner sides of the combustion chamber.

Air supplied by the fresh air inlet blower enters the hot air manifold near the exhaust end of the combustion chamber, and is heated as it flows counter to the travel of the refuse which is introduced at the inlet end of the combustion chamber. Thus, while approximately equal volumes of air are supplied along the length of the combustion chamber, the hottest air is supplied to the inlet end, and the coldest and densest air is supplied near the outlet end of the combustion chamber. The hot air supplied at the inlet end quickly heats the incoming refuse; the cooler, denser air supplied at the outlet end supplies more oxygen to effect total combustion and prevent emission of smoke.

The helical shaped auger flight is disposed concentrically about a supporting water cooled hollow shaft extending the length of the combustion chamber, and is spaced from the shaft by support members at uniform intervals along the shaft. This open area between the auger flight and the auger shaft allows air to circulate more freely, both radially and longitudinally.

The auger shaft is positioned rotatably and off-center from the longitudinal axis of the combustion chamber toward the bottom of the combustion chamber. This positions the outer edge of the auger flight very close to the bottom of the combustion chamber, so that essentially all of the refuse is moved through the combustion chamber, and none drops to the bottom and remains there. Also, this off-center placement of the auger shaft creates space between the auger and the top inner side of the combustion chamber to allow combustion gas to flow freely to the other end.

The pitch of the auger flight is varied from a maximum at the inlet end to a minimum at the outlet end of the combustion chamber, to compensate for the decrease in volume of solid particulate matter throughout the length of the combustion chamber as the refuse is burned.

The hollow auger shaft is cooled by passing water through it, in either a single or a double pass arrangement. In the double pass arrangement the hollow auger shaft contains a concentric pipe or smaller diameter extending the length of the combustion chamber. Cold water enters through the smaller pipe, flows the length of the combustion chamber, and then flows back to the same end as it entered in the annular space between the two pipes. The hot water leaving the auger shaft is then passed through a heat exchanger disposed in a passage for exhaust gases from the combustion chamber where this water is further heated and the exhaust gases are cooled.

Alternatively, where a supply of steam is desirable, a single passed arrangement of cooling water through the auger shaft can be used. Cold water is first passed through the above mentioned heated exchanger in the exhaust gas passage, and then introduced into one end of the hollow auger shaft. Saturated steam is then drawn out of the other end of the auger shaft and passed through a superheater coil in the exhaust gas passage disposed between the first mentioned heated exchanger and the combustion chamber, to superheat the steam. The exhaust gases leaving the above mentioned super-heater are passed through a centrifugal dust collector before being exhausted to the atmosphere.

A portion of the exhaust air leaving the dust collector is diverted by a blower to an air curtain located in the refuse feed hopper, creating an air pressure therein sufficiently high to prevent the flow of combustion air or gases out of the inlet side of the combustion chamber. At the same time, this hot exhaust gas pre-heats the refuse entering the incinerator.

Variable speed drives, such as hydraulic motors, or DC electric motors, are used as the drive means for the auger, the fresh air inlet blower, and the exhaust air blower. In operation, the speed of the auger drive motor can be controlled in dependence on the temperature sensing means located near the exhaust end of the combustion chamber, to assure complete combustion of the refuse. Likewise, the output of the fresh air inlet blower can be varied by varying the speed of its drive motor in dependence on a temperature sensing means located near the inlet end of the combustion chamber to assure that the air entering the combustion chamber at that point has been properly pre-heated in the hot air manifold. Since the exhaust air blower operates to oppose the pressure produced by the fresh air inlet blower, its speed can be varied the same as the fresh air inlet blower. Alternatively, the output of the exhaust air blower can be controlled in dependence on a directional air pressure sensing means disposed in the inlet hopper between the air curtain and the inlet section of the combustion chamber to increase the output to the exhaust air blower whenever reverse flow of air through the inlet hopper is sensed.

For start up of this incinerator, all fired igniters are disposed in the combustion chamber walls near the inlet combustion chamber to start the combustion of the refuse. Also during start up, a movable plate vertically disposed between the combustion chamber and the passage for exhaust gases, can be lowered to partially block passage of exhaust gases from the combustion chamber, thereby retaining heat in the combustion chamber to shorten the start up period.

These and other objects of the present invention will become more apparent to those skilled in the art from the following more detailed description and study of the appended drawings herein:

BRIEF DESCRIPTION OF THE DRAWINGS

FIG. 1 is a side elevational view of the incinerator with parts of the combustion chamber and exhaust passage being shown broken away to show other parts in detail;

FIG. 2 is a cross-sectional end view of the inlet end of the incinerator taken along lines 2—2 of FIG. 1;

FIG. 3 is a cross-sectional view of the exhaust end of the incinerator, taken along lines 3—3 of FIG. 1;

FIG. 4 is a cross-sectional view of the combustion chamber, taken along lines 4—4 of FIG. 1;

FIG. 5 is a water flow diagram for a double pass cooling arrangement for the auger tube; and FIG. 6 is a water flow diagram for a single pass cooling arrangement for the auger tube used for steam generation.

DESCRIPTION OF THE PREFERRED EMBODIMENTS

Referring now to the drawings, FIGS. 1–3 show a horizontally disposed stationary cylindrical combustion chamber 10 having an opening 12 in the inlet section 14 through which combustible refuse is fed from a feed hopper 16. The outlet section 18 has an upward-extending passage 20 for exhaust gases and a downward extending section defining an ash receptacle 22 which is filled with water to a predetermined level 24. Extending the length of the combustion chamber is a rotatable auger 26 having a tubular axis 28 supported at the inlet end 14 by bearing 30 mounted to the front wall 32 and at the outlet end 18 by another bearing 34 mounted to the rear wall 36, and driven by an hydraulic motor 38. The spiral flight 40 of the auger 26 extends from the front wall 32 to the ash receptacle 22, so that when the auger 26 is rotated, the auger flight 40 will convey combustible refuse entering from the feed hopper 16 through the combustion chamber 10, and deliver the solid residue to the ash receptacle 22. As can be seen in FIG. 1, the pitch of the auger flight 40 is greatest at the inlet section 14, and becomes gradually less toward the outlet section 18, to compensate for the reduction in volume of the refuse which takes place during combustion. The tubular axis 28 is positioned off center of the axis of the combustion chamber 10 so that there is minimum clearance between the outer edge 42 of the auger flight 40, to assure movement of essentially all of the refuse through the combustion chamber 10.

As shown in FIG. 1, the auger flight 40 is comprised of individual segments which are joined together and concentrically spaced from the tubular auger shaft 28 by a plurality of support members 44, so that an open annular space 46 is formed between the inner edge 48 of the auger flight 40 and the auger shaft 28. This open space 46 allows air to freely move upward through the combustion chamber 10 as well as along the auger shaft 28 to the outlet section 18. Different materials having different heat resistant characteristics can be used in forming these sections of the auger flight 40. For example, in the inlet portion, where there is little heat, carbon steel could be used, while stainless steel or a refractory alloy could be used in the rest of the combustion chamber 10.

The tubular auger shaft 28 is water cooled and the advantages of this type of construction will be now described. FIG. 1 shows an incoming water pipe 50 concentrically mounted within the tubular auger shaft 28 and connected to a source of cooling water 52. Water flows through this water pipe 50 the length of the combustion chamber 10, then reverses direction by reason of the baffle 54 and flows back and out the same end of the shaft 28 through the water outlet pipe 56. This water outlet pipe 56 connects to an inlet 58 of a heat exchanger 60 disposed in the exhaust gas passage 20, as shown in the water flow diagram of FIG. 5. After being further heated in this heat exchanger 60, the hot water is removed for use or storage elsewhere through a hot water pipe 62.

FIG. 6 shows an alternate cooling water arrangement that can be used where a source of steam is desired. In this alternate arrangement, cool water first enters the heat exchanger 60 through the inlet 58, flows out of the heat exchanger 60 through outlet pipe 62 which is connected to the end of the tubular auger shaft 28 at the end of the incinerator. In this arrangement, the inlet pipe 50 and the baffle or blocking partition 54 are omitted. Steam is generated from the hot water entering the tubular auger shaft 28, and is drawn off at a steam outlet 64 on the exhaust end of the shaft 28, which is connected to an inlet 66 of a steam superheater coil 68 disposed in the exhaust gas passage 20 between the exhaust end of the combustion chamber 10 and the heat exchanger 60. The dry steam flows from the superheater coil 68 through an outlet 70 for use elsewhere.

Combustion air is supplied to the combustion chamber 10 by a fresh air inlet blower 72 driven by a hydraulic motor 74, through a hot air manifold 76 disposed within and extends longitudinally along the top of the combustion chamber 10. This hot air manifold is formed of heat resistant metal to form a passage shaped in cross-section as an annular segment to conform to the inner wall 78 of the combustion chamber 10, with an open end at the exhaust end of the combustion chamber 10 to receive air from the fresh air inlet blower 72 and a closed end at the inlet end of the combustion chamber 10. The bottom of the hot air manifold 76 is uninsulated from the combustion chamber 10 so that the air flowing in the manifold 76 can be preheated before entering the combustion chamber 10. A first plurality of hot air pipes 80 extends at uniform intervals from both sides of the hot air manifold 76 through the refractory inner wall 78, around the combustion chamber to randomly spaced openings 82 in the lower portion of the combustion chamber 10, which direct the air radially inward and upward through the combustion chamber. A second plurality of short hot air pipes 84 extend along at uniform intervals from both sides of the hot air manifold 76 to direct air tangentially along the top sides of the combustion chamber 10.

Turning again to FIG. 1 it will be noted that there is shown a curved portion 86 of the exhaust gas passage 20 in which a plurality of inwardly projecting baffle plates 88 are disposed on the inside of the outermost curved wall to serve as preliminary dust collector traps, to trap a portion of the solid particulate matter in the exhaust gas and allow it to fall into the ash receptacle.

The solid particulate matter which falls into the ash receptacle 22 is cooled by the water therein, and then removed by a rotatable auger 90 which extends downward into the ash receptacle 22, and driven by a motor 92, as shown in FIG. 3. This ash receptacle 22 has a sloping end wall and a semi-circular sloping bottom 94 concentric to and in close proximity with the ash removal auger 90, so that essentially all solid particulate matter which enters the ash receptacle is directed to the ash removal auger 90.

Solid particulate matter is also removed from the exhaust gases in a dust precipitator 96 disposed near the outlet end of the exhaust gas passage 20.

Also, as shown in FIG. 2, an exhaust gas blower 98 driven by a hydraulic motor 100 directs a portion of the exhaust gas which leaves the dust precipitator 96 to a plurality of inlets 102 in the feed hopper 16 forming an air curtain 104, so that the air pressure of the air curtain 104 is approximately equal to the air pressure of the combustion air in the combustion chamber 10. This prevents the backward flow of exhaust gases and smoke from the combustion chamber 10. Also, this exhaust gas preheats the incoming combustible refuse.

A directional air pressure sensor 106, (FIG. 1) disposed within the feed hopper 12, senses a backward flow of combustion air and increases the speed of the hydraulic motor 100 for the exhaust gas blower 98 by a control means in the control panel 108.

A temperature sensor 110, disposed on the inner wall 78 of the combustion chamber 10 near the inlet to the combustion chamber 10 is connected to a control means in the control panel 108 to regulate the speed of the hydraulic motor 74 driving the fresh air inlet blower 72 proportional to the temperature sensed by sensor 110, to assure that the air which enters the inlet end of the combustion chamber 10 is sufficiently pre-heated.

In a similar manner, a temperature sensor 112, disposed on the inner wall 78 of the combustion chamber 10 near the exhaust end of the combustion chamber 10 is connected to a control means in the control panel 108 to regulate the speed of the hydraulic motor 38 for the auger 26 in dependence on the exhaust end combustion chamber temperature, to assure complete combustion and reduce the smoke emission from the combustion chamber 10.

There is best shown in FIG. 2, two oil fired ignitors 114 which are disposed in the inner wall 78 of the combustion chamber 10 near the inlet section 14 to initiate combustion of the refuse on initial start up of the incinerator. Also, a movable plate 116, vertically disposed on a side of the exhaust gas passage 20 at the exhaust end of the combustion chamber 10, can be lowered during the start up period to partially block passage of exhaust gases from the combustion chamber 10, thus retaining heat in the combustion chamber 10 and thereby reducing the start up time.

What is claimed is:

1. An incinerator for burning combustible refuse which comprises:
   a horizontally disposed stationary cylindrical combustion chamber means having an inlet end for receiving refuse and an outlet end for discharging exhaust gases and residue;
   ignition means adjacent said inlet end for igniting the refuse;

screw conveyor means extending through the length of said chamber means for moving refuse therethrough;

air supply means for supplying combustion air under pressure;

stationary hot air manifold means, extending substantially the length of said chamber means in heat exchange relationship therewith, said manifold means having distributing means for admitting approximately equal volumes of air along the length of said chamber means; and means for delivering said air under pressure from said air supply means to said manifold means adjacent the outlet end of said chamber means;

whereby the air is selectively pre-heated as it flows longitudinally through said manifold means counter to the flow of refuse through said chamber means, with the hottest air being admitted at the inlet end of said chamber means to quickly heat incoming refuse, and cooler, denser air containing more oxygen being admitted at the outlet end of said chamber means, to effect total combustion and prevent emission of smoke.

2. An incinerator, as described in claim 1, wherein:

said chamber means further includes an inner cylindrical side wall of refractory material;

said manifold means is positioned in said chamber means in an area above said screw conveyor means; and said manifold means includes longitudinally extending, opposed side walls having curvilinear air distributing means for feeding air upwardly into a lower portion of said chamber means, said curvilinear air distributing means being confined in said inner side wall of said chamber means.

3. An incinerator, as described in claim 2, wherein said side walls of said manifold means further include air distributing means for feeding air into an upper portion of said chamber means tangentially to said inner wall of said chamber means, whereby the air is directed downwardly by the curvature of said inner wall to effect good mixing of air with the refuse, and the flow of air along said inner wall prevents refuse from sticking to said inner wall.

4. An incinerator, as described in claim 1, which further comprises a water-filled ash receptacle means adjacent the outlet end of said chamber means for receiving residue therefrom.

5. An incinerator, as described in claim 4, which further comprises ash removal means for removing cooled residue from the ash receptacle means, said ash removal means including:

a rotatable helical screw conveyor extending across and downward into said ash receptacle means, wherein said ash receptacle means has a semicircular sloping bottom concentric to, and in close proximity with, said helical screw conveyor; and a drive means for rotating said helical screw conveyor.

6. An incinerator, as described in claim 1, wherein said screw conveyor means comprises a rotatable auger which includes:

a tubular axis;

a spiral flight disposed about said tubular axis; and a plurality of support members connecting and supporting said spiral flight in spaced concentric relation to said tubular axis, said spiral flight and said tubular axis defining an open annular space around said tubular axis defining an open annular space around said tubular axis.

7. An incinerator, as described in claim 6, wherein said tubular axis is positioned off-center from the longitudinal axis of said chamber means toward the bottom of said chamber means, whereby an outer edge of said spiral flight is positioned very close to the bottom of said chamber means to move essentially all of the refuse through said chamber means.

8. An incinerator, as described in claim 6, wherein said spiral flight of said rotatable auger has a larger pitch at said outlet end of said chamber means and a smaller pitch at said outlet end of said chamber means to compensate for a reduction in volume of the refuse during combustion.

9. An incinerator, as described in claim 6, which further comprises:

a variable speed drive means for said rotatable auger;

temperature sensing means for sensing combustion gas temperature at said outlet end of said chamber means; and a control means to regulate the speed of said conveyor drive means in proportion to a combustion chamber outlet temperature sensed by said temperature sensing means.

10. An incinerator, as described in claim 1, further comprising a means for partially blocking said outlet end of said chamber means during start-up of the incinerator.

11. An incinerator, as described in claim 1, which further comprises hopper means adjacent the inlet end of said chamber means for feeding refuse thereinto, said hopper means having an air curtain means for diverting at least a portion of the exhaust gases discharged from said chamber means, to preheat incoming refuse and prevent emission of combustion gases from the inlet end of said chamber means.

12. An incinerator, as described in claim 11, in which said curtain means further comprises:

a blower;

a variable speed drive means for said blower;

a directional air pressure sensing means disposed between said curtain means and said chamber means; and a control means to regulate the speed of said variable speed blower drive means in proportion to a pressure sensed by said pressure sensing means.

13. An incinerator, as described in claim 11, in which said curtain means comprises:

an exhaust gas blower;

a variable speed drive means for said exhaust gas blower; and a control means to regulate the speed of said variable speed drive means for said exhaust gas blower in proportion to a combustion chamber inlet temperature sensed by said temperature sensing means.

14. An incinerator, as described in claim 1, in which said air supply means comprises:

a fresh air inlet blower;

a variable speed drive means for said fresh air inlet blower;

temperature sensing means for sensing combustion air temperature adjacent said inlet end of said chamber means; and a control means to regulate the speed of said variable speed drive means for said fresh air inlet blower in proportion to a combustion chamber inlet temperature sensed by said temperature sensing means.

15. An incinerator, as described in claim 1, which further comprises:
 precipitator means for removing solid particles from the exhaust gases; and
 conduit means for conducting the exhaust gases from the outlet end of said chamber means to said precipitator means.

16. An incinerator, as described in claim 1, which further comprises:
 heat exchanger means for receiving heat from the exhaust gases discharged from the outlet end of said chamber means; and
 conduit means for conducting the exhaust gases from the outlet end of said chamber means to said heat exchanger means.

17. An incinerator, as described in claim 1, which further comprises means for introducing water into and out of said tubular axis, said means for introducing water including:
 an inlet pipe of smaller diameter than said tubular axis, concentrically disposed within said tubular axis, extending from one end of said tubular axis through said tubular axis to said inlet end of said chamber means; and
 a water outlet means connecting to said tubular axis at the same end as said inlet pipe.

18. An incinerator, as described in claim 17, which further comprises:
 heat exchanger means for transferring heat from the exhaust gases discharged from the outlet end of said chamber means to water circulated therethrough;
 gas conduit means for conducting the exhaust gases from the outlet end of said chamber means to said heat exchanger means; and
 water conduit means for connecting said water outlet means of said tubular axis to a water inlet of said heat exchanger means.

19. An incinerator, as described in claim 1, which further comprises means introducing water into and out of said tubular axis, said means for introducing water including:
 a water inlet means at one end of said tubular axis; and
 a steam outlet means at an opposite end of said tubular axis.

20. An incinerator, as described in claim 19, which further comprises:
 heat exchanger means for transferring heat from the exhaust gases discharged from the outlet end of said chamber means to water circulated therethrough;
 gas conduit means for conducting the exhaust gases from the outlet end of said chamber means to said heat exchanger means, said gas conduit means including a superheater steam coil disposed therein;
 water conduit means for connecting said water inlet means of said tubular axis to a water outlet of said heat exchanger means; and
 steam conduit means for connecting said steam outlet means of said tubular axis to a steam inlet of said superheater coil.

21. An incinerator for burning combustible refuse which comprises:
 a horizontally disposed stationary cylindrical combustion chamber means having an inlet end for receiving refuse and an outlet end for discharging residue and exhaust gases;
 ignition means adjacent said inlet end for igniting said refuse;
 screw conveyor means extending through the length of said chamber means for moving refuse at a decreasing rate from the inlet end to the outlet end of said chamber means as the volume of refuse is reduced by combustion, to effect better combustion of particulate smoke at the outlet end of said chamber means, said screw conveyor means including a rotatable auger having a longitudinal axis and a spiral flight concentrically disposed about said auger axis, said spiral flight having a larger pitch at the inlet end of said chamber means and a smaller pitch at the outlet end of said chamber means; and
 air supply means for supplying combustion air to said chamber means.

* * * * *